United States Patent
Kwatra et al.

(12) 
(10) Patent No.: US 11,245,735 B1
(45) Date of Patent: Feb. 8, 2022

(54) SCREEN-SHARING CONTENT RECONFIGURATION

(71) Applicant: INTERNATIONAL BUSINESS MACHINES CORPORATION, Armonk, NY (US)

(72) Inventors: Shikhar Kwatra, San Jose, CA (US); Martin G. Keen, Cary, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/952,156

(22) Filed: Nov. 19, 2020

(51) Int. Cl.
   *H04L 29/06* (2006.01)
   *G06Q 10/10* (2012.01)

(52) U.S. Cl.
   CPC ........ *H04L 65/403* (2013.01); *G06Q 10/101* (2013.01); *H04L 65/4015* (2013.01)

(58) Field of Classification Search
   None
   See application file for complete search history.

(56) References Cited

U.S. PATENT DOCUMENTS

| | | |
|---|---|---|
| 8,010,516 B2 | 8/2011 | Ishii |
| 8,473,839 B2 | 6/2013 | Koren |
| 9,465,803 B2 | 10/2016 | Sik |
| 9,996,367 B1 | 6/2018 | Bao |
| 2007/0136686 A1 | 6/2007 | Price |
| 2008/0174427 A1* | 7/2008 | Banerjee .............. G06F 21/84 340/541 |
| 2008/0282356 A1 | 11/2008 | Grabarnik |
| 2011/0202850 A1 | 8/2011 | Chan |
| 2011/0252366 A1 | 10/2011 | Balasubramanian |
| 2012/0036452 A1 | 2/2012 | Coleman |

(Continued)

FOREIGN PATENT DOCUMENTS

WO   2016006978 A1   1/2016

OTHER PUBLICATIONS

Anonymous, "Method to hide sensitive documents in screen sharing," IP.com Disclosure No. IPCOM000253129D, Publication Date: Mar. 7, 2018, pp. 1-4.

(Continued)

*Primary Examiner* — Chris Parry
*Assistant Examiner* — Abderrahmen Chouat
(74) *Attorney, Agent, or Firm* — Tihon Poltavets

(57) ABSTRACT

A method for managing primary content and secondary content being displayed on a primary device associated with a presenter user during a collaborative session with one or more participant users includes initializing the collaborative session between a presenter user and one or more participant users, where a display of the primary device associated with the presenter user is viewable by the one or more participant users, The method also includes analyzing the user context and the content context with regards to the one or more participant users and various content in the first display of the primary device, where the various content is categorized by primary content and secondary content. Responsive to determining a negative implication is detected for the secondary content in the display of the primary device, performing a corrective action that prevents the one or more participant users from viewing the secondary content.

15 Claims, 5 Drawing Sheets

(56) References Cited

U.S. PATENT DOCUMENTS

| | | | |
|---|---|---|---|
| 2012/0144323 A1* | 6/2012 | Sirpal | G06F 3/1431 |
| | | | 715/761 |
| 2014/0215356 A1 | 7/2014 | Brander | |
| 2015/0278534 A1 | 10/2015 | Thiyagarajan | |
| 2017/0003927 A1 | 1/2017 | Sik | |
| 2017/0024100 A1* | 1/2017 | Pieper | H04L 65/80 |
| 2017/0040002 A1* | 2/2017 | Basson | G06F 21/84 |
| 2018/0357440 A1* | 12/2018 | Brady | G06F 21/6218 |

OTHER PUBLICATIONS

Mell et al., "The NIST Definition of Cloud Computing", National Institute of Standards and Technology, Special Publication 800-145, Sep. 2011, pp. 1-7.

* cited by examiner

SCREEN-SHARING CONTENT RECONFIGURATION

BACKGROUND

This disclosure relates generally to collaborative screen-sharing sessions, and in particular to content reconfiguration during collaborative screen-sharing sessions.

Various web-based tools allow for multiple users to collaborate, where a presenter user has the ability to present content to multiple participant users during a collaboration session. The presenter user has the ability to present the content to the multiple participant users by utilizing a screen sharing feature, which allows for the multiple participants to view the screen of an electronic device (e.g., laptop computer) utilized by the presenter user. Though the presenter user typically utilizes a single program to present content to the multiple participants, the presenter user can have multiple programs activate during the coloration sessions. The multiple programs can include sensitive or proprietary information that the multiple participants are not privy to and an in-advert action by the presenter user can allow for the sensitive or proprietary information to be viewable by the multiple participants during the collaboration session.

SUMMARY

Embodiments in accordance with the present invention disclose a method, computer program product and computer system for content reconfiguration during a collaborative screen-sharing session, the method, computer program product and computer system can initialize a collaborative session between a presenter user and one or more participant users, wherein a first display of a primary device associated with the presenter user is viewable by the one or more participant users. The method, computer program product and computer system can analyze user context for the presenter user with regards to the one or more participant users and various content in the first display of the primary device, wherein the various content is categorized by primary content and secondary content. The method, computer program product and computer system can analyze content context for the presenter user with regards to the one or more participant users and the various content in the first display of the primary device. The method, computer program product and computer system can, responsive to determining a negative implication is detected for the secondary content in the display of the primary device, identify a corrective action to address the negative implication for the secondary content. The method, computer program product and computer system can perform the corrective action, wherein the corrective action prevents the one or more participant users from viewing the secondary content.

DETAILED DESCRIPTION

Embodiments of the present invention manages primary content and secondary content being displayed on primary client device associated with a presenter user during a collaborative screen-sharing session with multiple participant users. Primary content represents content that is sharable by the presenter user with the multiple participant users during the collaborative session, where the primary content does not result in negative implications. Secondary content represents content that is also sharable but may result in negative implication if inadvertently shared by the presenter user with the multiple participant users during the collaborative session. Negative implications relate to the secondary content being shared (i.e., displayed) to the multiple participant users that may include a release of sensitive information, a release of confidential information, a release of irrelevant information with regards to the primary content, and a release of irrelevant of information with regards to the topic of discussion.

Furthermore, another negative implication can include time spent (e.g., x>one minute) in organizing the secondary content in the user interface of a display on the primary device during the collaborative session, where the organizing can include closing (i.e., suspending), resizing, collapsing the secondary content (e.g., documents, webpages, software programs). Though the presenter user can prepare their display on the primary device for the collaborative session prior to sharing the display with the multiple participant users, one or more notifications can appear corresponding to active secondary content. For example, if the presenter email receives an email, a notification can appear on the user interface indicating an email was received and a title associated with the email, where the title of email may be deemed sensitive and/or confidential if viewed by anyone other than the intended recipient (i.e., the presenter user).

Figure 1:
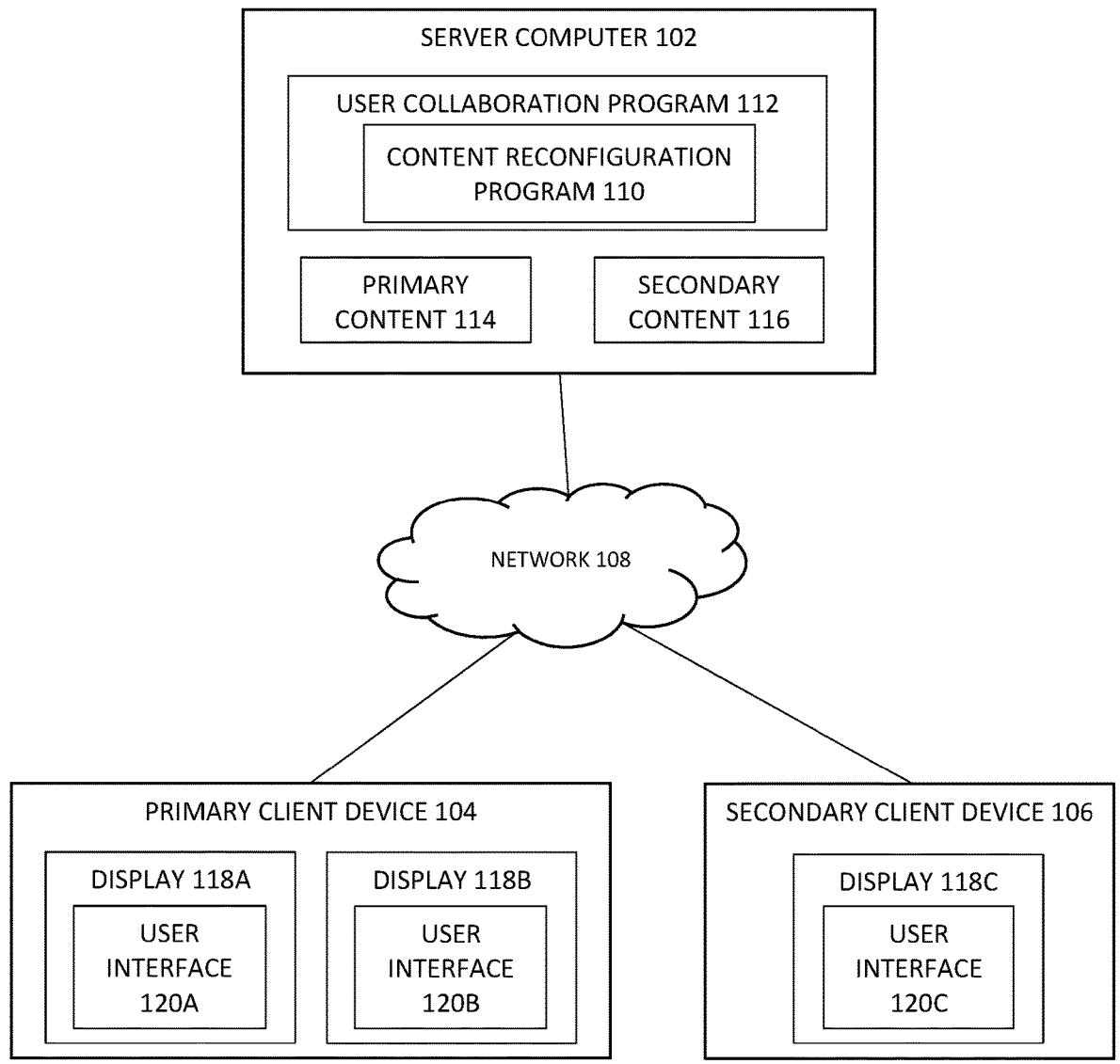
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, primary client device 104, and secondary client device 106, all interconnected over network 108.

Server computer 102 may be a desktop computer, a laptop computer, a tablet computer, a specialized computer server, a smartphone, or any computer system capable of executing the various embodiments of content reconfiguration program 110. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. Server computer 102 includes content reconfiguration program 110 and user collaboration program 112, where reconfiguration program 110 manages primary content 114 and secondary content 116 for primary client device 104 and secondary client device 106 while utilizing user collaboration program 112 for a collaborative screen-sharing session. In this embodiment, content reconfiguration program 110 operates as part of user collaboration program 112 via an integrated feature of user collaboration program 112 or as a plugin feature of user collaboration program 112. In other embodiments, content reconfiguration program 110 is independent of user collaboration program 112.

Primary client device 104 and secondary client device 106 may each be a cellphone, smartphone, smartwatch, laptop, tablet computer, or any other electronic device capable of communicating via network 108. In general, primary client device 104 and secondary client device 106 each represent one or more programmable electronic devices or combination of programmable electronic devices capable of executing machine readable program instructions and communicating with other computing devices (not shown) within distributed data processing environment via a network, such as network 108. In one embodiment, primary client device 104 and secondary client device 106 each represent an electronic device associated with a presenter user, where the presenter user is presenting to multiple participant users during a collaborative screen-sharing session. In this embodiment, primary client device 104 includes display 118A and 118B with user interface 120A and 120B, respectively. User interface 120A and 120B enables a user of primary client device 104 to interact with content reconfiguration program 110 and user collaboration program 112 on server computer 102. Secondary client device 106 includes display 118C with user interface 120C, where user interface 120C enables a user of secondary client device 106 to interact with content reconfiguration program 110 and user collaboration program 112 on server computer 102.

Content reconfiguration program 110 manages primary content 114 and secondary content being displayed on primary client device 104 and secondary client device 106 during a collaborative screen-sharing session supported by user collaboration program 112. Content reconfiguration program 110 initiates a collaborative screen-sharing session, where a presenter user is to share a display screen (e.g., display 118A) with multiple participant user. In one example, the presenter user shares display 118A with the multiple participant users, which allows for the multiple participant users to view various content in user interface 120A of display 118A on primary client device 104 associated with the presenter user. Content reconfiguration program 110. The various content is defined by primary content 114 and secondary content 116, where primary content 114 is for viewing by the multiple participant users and secondary content 116 is not for viewing by the multiple participant users. Content reconfiguration program 110 categorizes the various content into primary content 114 and secondary content 116 by analyzing user context for the presenter user in the collaborative screen-sharing session. User context represents user specific information that includes but is not limited to, calendar data, user profile data, relationship assessment data, collaborative pattern data, program data, and user feedback data. The user specific information can be stored on server computer 102, primary client device 104, and/or secondary client device 106.

Subsequently, content reconfiguration program 110 analyzes content context for the presenter user in the collaborative screen-sharing session with respect to the user context. Content reconfiguration program 110 utilizes the user context to determine which portions of the various content is primary content 114 for displaying to the multiple participant users and which portions of the various content is secondary content 116 for not displaying to the multiple participant users. In the event content reconfiguration program 110 determines secondary content 116 includes negative implications and identifies a corrective action (i.e., amelioration action) to address the negative implications of secondary content 116. Content reconfiguration program 110 performs the corrective action for the negative implication of secondary content 116, where the corrective action prevents the multiple participant users from viewing secondary content 116.

The corrective action can include one or more of temporary suspending (i.e., closing) one or more programs or browser windows with secondary content 116, encapsulating and clustering secondary content 116 into a newly created file folder, restricting secondary content 116 in user interface 120A in display 118A, and reformatting secondary content 116 based on user preferences and cognitive heuristics of the multiple participant users. The corrective action can also include snipping secondary content 116 with various omitting boxes and temporarily overlay information on the omitting box covering secondary content 116 and moving secondary content 116 from user interface 120A of display 118A to user interface 120B of display 118B and/or to user interface 120C of display 118C on secondary client device 106 associated with the presenter user. Furthermore, any future notification associated with the secondary content 116 (e.g., new email notification, new post notification) is sent to user interface 120 of display 118C on secondary client device 106, such that the notification is not viewable by the multiple participant users. In the event content reconfiguration program 110 determines the collaborative screen-sharing session has ended between the presenter user and the multiple participant users, content reconfiguration program 110 reverts the corrective action for secondary content 116.

In general, network 108 can be any combination of connections and protocols that will support communications between server computer 102, primary client device 104, and secondary client device 106. Network 108 can include, for example, a local area network (LAN), a wide area network (WAN), such as the internet, a cellular network, or any combination of the preceding, and can further include wired, wireless, and/or fiber optic connections. In one embodiment, content reconfiguration program 110 and user collaboration program 112 can be a web service accessible via network 108 to a user of primary client device 104 and secondary client device 106. In another embodiment, content reconfiguration program 110 and user collaboration program 112 may be operated directly by a user of server computer 102.

Figure 2:
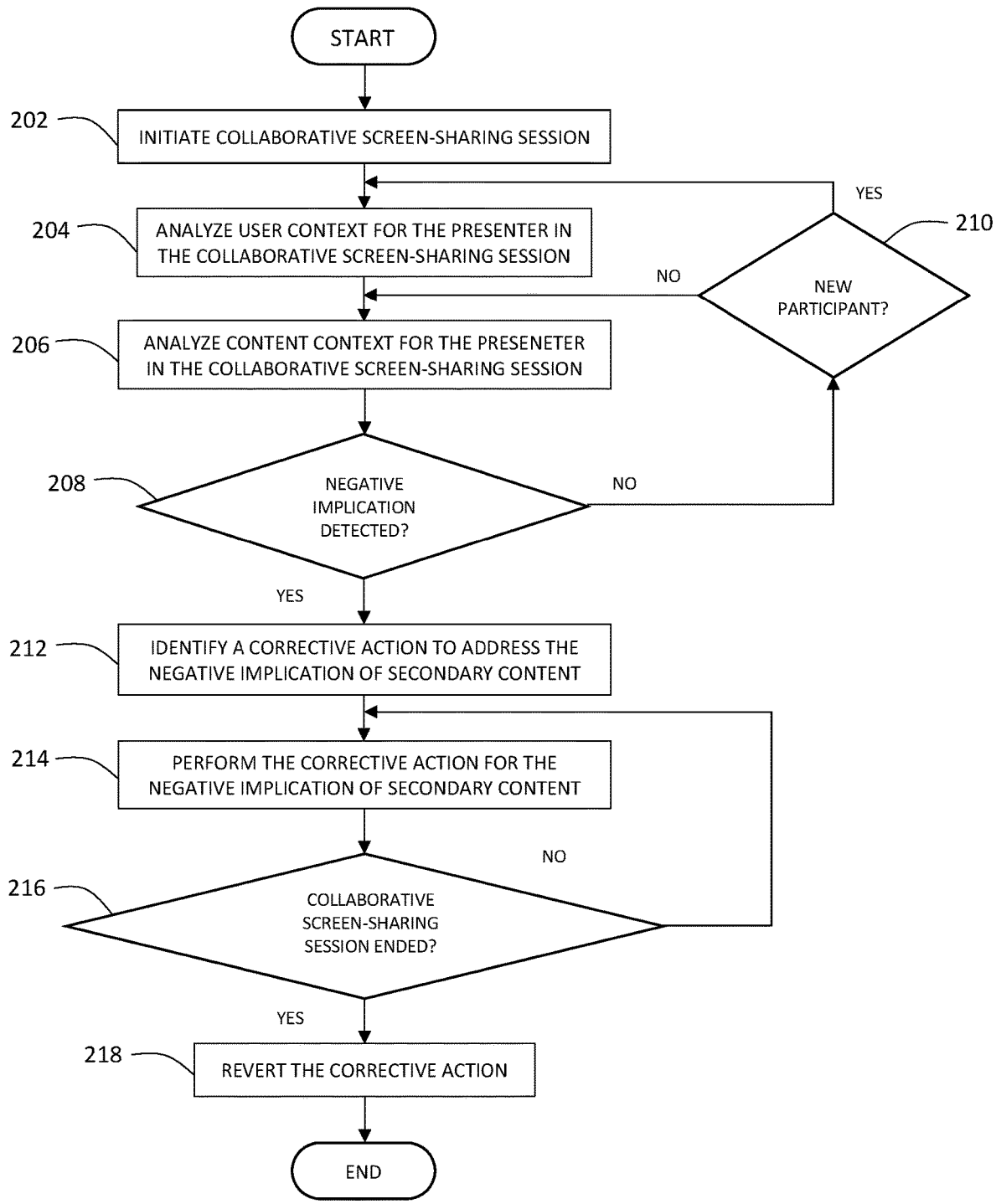
FIG. 2 is a flowchart depicting operational steps of a content reconfiguration program, on a server computer within the distributed data processing environment of FIG. 1, for reconfiguring secondary content during a collaborative screen-sharing session, in accordance with an embodiment of the present invention.

FIG. 2 is a flowchart depicting operational steps of a content reconfiguration program, on a server computer within the distributed data processing environment of FIG. 1, for reconfiguring secondary content during a collaborative screen-sharing session, in accordance with an embodiment of the present invention.

Content reconfiguration program 110 initiates collaborative screen-sharing session (202). Content reconfiguration program 110 initiates collaborative screen-sharing session between a presenter user (i.e., host) and multiple participant users, where the presenter user is presenting content to the multiple participant users. The presenter user presents the content to the multiple participant users by screen-sharing a display of an electronic device being utilized by the present user. In one embodiment, the presenter user allows for an entire display and operating system user interface to be visible to the multiple participant users during the collaborative screen-sharing session. In another embodiment, the presenter user selects one or more programs operating on an electronic device associated with the presenter user, where one or more user interfaces of the selected one or more programs are visible by the multiple participant users during the collaborative screen-sharing session. As previously discussed, content reconfiguration program 110 can operate as an integrated feature of a web-based user collaboration program or as a plug-in feature of the web-based user collaboration program.

Content reconfiguration program 110 analyzes user context for the presenter in the collaborative screen-sharing session (204). In this embodiment, content reconfiguration program 110 analyzes the user context for the presenter user in the collaborative screen-sharing session with respect to the multiple participant users. User context represents user specific information that includes but is not limited to, calendar data, user profile data, relationship assessment data, collaborative pattern data, program data, and user feedback data. For the calendar data, content reconfiguration program 110 identifies a calendar entry associated with the initiated collaborative screen-sharing session based on a scheduled time, a scheduled date, and a list of participant users. Subsequent to identifying the calendar entry, content reconfiguration program 110 identifies a meeting agenda for the collaborative screen-sharing session. Based on the identified meeting agenda, content reconfiguration program 110 categorizes various content in a user interface on a display of a primary client device being utilized by the presenter user. Content reconfiguration program 110 categorizes primary content as a portion of the various content relating to the identified meeting agenda and secondary content as a portion of the various content not relating to the identified meeting agenda. For user profile data, content reconfiguration program 110 utilizes one or more preferences defined by the presenter user for the user profile data for which a portion of the various content is primary content shareable (e.g., word processor programs, presentation programs, spreadsheet programs) with the participant users and another portion of the various content is secondary content not shareable (e.g., web browsers, finance management programs, employee management programs) with the participant users.

For relationship assessment data, content reconfiguration program 110 utilizes an accessible employee directory to identify relationships between the presenter user and each of the participant users. The relationship assessment data can include job titles for the presenter user and the participant users, job descriptions for the presenter user and the participant users, and a chain of command for the present user and the participant users. Content reconfiguration program 110 utilizes the relationship assessment data to identify a portion of the various content that is primary content shareable with the participant users, where the participant users are privy to the primary content being displayed by the presenter user. Content reconfiguration program 110 utilizes the relationship assessment data to identify another portion of the various content that is secondary content not shareable with the participant users, where the participant users are not privy to the secondary content being displayed by the presenter user. Furthermore, for each participant user, content reconfiguration program 110 can identify different portions of the various content as primary content and secondary content. For example, if content reconfiguration program 110 determines participant user A has a job title (e.g., manager) that allows for content A displayed by the presenter user to be viewable, content reconfiguration program 110 identifies content A as primary content for the participant user A. However, if content reconfiguration program 110 determines participant user B has a job title that does not allow for content A displayed by the presenter user to be viewable, content reconfiguration program 110 identifies content A as secondary content for the participant user B.

For collaborative pattern data, content reconfiguration program 110 utilizes captured data for previous collaborative screen-sharing sessions to identify which portion of the various content is primary content and which portion of the various is secondary content. Content reconfiguration program 110 utilizes machine learning to establish the collaborative patterns based on the captured data for the previous collaborative screen-sharing sessions. In one example, prior to initiating a collaborative screen-sharing session, the presenter user typically closes (i.e., terminates) any active web browser and program A. Content reconfiguration program 110 utilizes this captured data prior to the initialization of the collaborative screen-sharing session and establishes collaborative pattern data that identifies any active web browser and program A as secondary content. Therefore, for any subsequent collaborative screen-sharing session, content reconfiguration program 110 can identify any active web browser and program as secondary content that would require corrective action, discussed in further detail with regards to (212).

For program data, content reconfiguration program 110 identifies which portions of a user interface of a specific program are typically shared with the participant users (e.g., presentation slides) and which portions of the user interface of the specific program are typically not shared with the participant users (e.g., presenter users associated with each presentation slide). Content reconfiguration program 110 utilizes machine learning to establish the program data for a specific program and identifies the typically shared portions as primary content and the typically not shared portions as secondary content. For user feedback data, content reconfiguration program 110 utilizes previously received presenter user feedback to adjust which portions of the various content in the user interface is primary content and secondary content. Content reconfiguration program 110 can utilize a feedback system that queries the presenter user to confirm or deny future categorization of portions of the various content as primary content or secondary content.

Content reconfiguration program 110 analyzes content context for the presenter in the collaborative screen-sharing session (206). In this embodiment, content reconfiguration program 110 analyzes the content context for the presenter user in the collaborative screen-sharing session with respect to the multiple participant users. Content reconfiguration program 110 can identify instances of undesirable webpages in web browsers, active social networking platforms, sensitive documents, and confidential documents. For undesirable webpages in web browsers, content reconfiguration program 110 has the ability to determine whether a blog, article, or general webpage in a web browser corresponds to a previously identified meeting agenda. If the web browser content (e.g., news webpage, commerce webpage) does not correspond to the previously identified meeting agenda, content reconfiguration program 110 identifies the web browser content as secondary content. If the web browser content (e.g., product announcement, technical research) does correspond to the previously identified meeting agenda, content reconfiguration program 110 identifies the web browser content as primary content. For active social networking platforms, content reconfiguration program 110 marks the various content associated with the active networking platforms as secondary content.

For sensitive documents and confidential documents, content reconfiguration program 110 determines whether the sensitive documents and the confidential documents to be viewable by the participant users. Content reconfiguration program 110 utilizes the relationship assessment data from the user context analysis to determine which sensitive documents and confidential documents are primary content and secondary content. If the relationship assessment data indicates a portion of the sensitive documents and the confidential documents are not to be shared with the participant users, content reconfiguration program 110 identifies the portion of the sensitive documents and the confidential documents as secondary content. If the relationship assessment data indicates another portion of the sensitive documents and the confidential documents are to be shared with the participant users, content reconfiguration program 110 identifies the portion of the sensitive documents and the confidential documents as primary content.

Content reconfiguration program 110 determines whether a negative implication was detected for the secondary content (decision 208). A negative implication can include one or more risk factors being exceeded for one or more portions of the secondary content. The risk factors can include a dissatisfied client, release of sensitive information, release of confidential information, and any other potential negative effect of sharing the secondary content with the multiple participant users. In the event, content reconfiguration program 110 determines a negative implication was not detected for the secondary content ("no" branch, decision 208), content reconfiguration program 110 determines whether a new participant user has joined the collaborative screen-sharing session (decision 210). In the event, content reconfiguration program 110 determines a negative implication was detected for the secondary content ("yes" branch, decision 208), content reconfiguration program 110 identifies a corrective action to address a negative implication of secondary content (212).

Content reconfiguration program 110 determines whether a new participant user has joined the collaborative screen-sharing session (decision 210). In the event, content reconfiguration program 110 determines a new participant user has joined the collaborative screen-sharing session ("yes" branch, decision 210), content reconfiguration program 110 reverts back to analyzing user content for the presenter in the collaborative screen-sharing session with respect to the participant user and the new participant user. In the event, content reconfiguration program 110 determines a new participant user has not joined the collaborative screen-sharing session ("no" branch, decision 210), content reconfiguration program 110 reverts back to analyze content context for the presenter in the collaborative screen-sharing session with respect to the participant users.

Content reconfiguration program 110 identifies a corrective action to address a negative implication of secondary content (212). A corrective action can include temporarily closing or minimizing the secondary content application, tab, document, or program for a configurable amount of time. The configurable amount of time can be based on an expected duration of the collaborative session according to a calendar entry, an expected duration of the collaborative session according to a calendar entry duration plus a buffer period (e.g., additional 30 minutes), or until content reconfiguration program 110 determines the collaborative screen-sharing session ended in (decision 216). Another corrective action can include encapsulating and clustering content into a newly created file folder. Content reconfiguration program 110 encapsulates portions of a file representing the secondary content and stores the encapsulated portions of the file in clusters within the newly created file folder, where the presenter user has access to the encapsulated portions of the file in the newly created file folder. Content reconfiguration program 110 allows for the presenter to revert the encapsulated portions of the file (i.e., the secondary content) in the newly created file folder back to the file from which they were encapsulated. Yet another corrective action can include snipping the secondary content with various omitting boxes, where the omitting boxes are overlayed on top of the secondary content preventing the participant users from viewing the secondary content with the negative implications. Furthermore, content reconfiguration program 110 can temporarily overlay information on the omitting boxes, where the overlayed information can include portions of primary content and/or details regarding the collaborative screen-sharing session (e.g., expected duration, list of participants, meeting agenda, summary point for the primary content). Content reconfiguration program 110 can also temporarily overlay additional content related to the primary content, where the additional content can include term definitions or webpages to hyperlinks presented in the primary content.

Yet another corrective action can include restructuring the primary content and/or the secondary content, such that the secondary content with the detected negative implications is not viewable during the collaborative screen-sharing session. Content reconfiguration program 110 can alter a size of the primary content and/or the secondary content, such that the secondary content with the detected negative implication is not legible. Content reconfiguration program 110 can crop a window for the secondary content, where cropping the window for the secondary content hides a portion of the secondary content with the detected negative implications. Content reconfiguration program 110 can also extend a window for the primary content to overlap the secondary content with the detected negative implications, where the primary content prevents the participant users from viewing the secondary content. Yet another corrective action can include reformatting the secondary content with the detected negative implication based on user preferences and cognitive heuristics of the participant users. Content reconfiguration program 110 can replace sensitive or confidential text (e.g., addresses and identification numbers) with generic text such as, "omitted due to sensitive" or "omitted due to confidentiality". Yet another corrective action can include routing the secondary content with the detected negative implication to another display on the primary client device only viewable by the presenter user and/or to another display on a secondary client device associated with the presenter user, where the secondary content is viewable by the presenter user on the secondary client device.

In one embodiment, content reconfiguration program 110 identifies a corrective action to address the negative implication of the secondary content based on presenter user preferences. Content reconfiguration program 110 allows for the presenter user to define which corrective action is to be taken to address the negative implication of the secondary content. Content reconfiguration program 110 has the ability to utilize machine learning to constantly update the presenter user preference based on subsequent alterations (i.e., feedback loop) to which corrective action is performed by content reconfiguration program 110. The presenter user preferences can define which corrective action content reconfiguration program 110 utilizes based on a type of secondary content. For example, content reconfiguration program 110 identifies a first corrective action to address secondary content that includes a web browser and a second corrective action to address secondary content that includes a specific program. The presenter user preferences can further define which corrective action content reconfiguration program 110 utilizes based on a type of group of participant users. For example, content reconfiguration program 110 identifies a first corrective action to address secondary content for collaborative screen-sharing session that includes a first group of participant users (e.g., team members) and a second corrective action to address secondary content for a collaborative screen-sharing session that includes a second group of participant users (e.g., management team).

In another embodiment, content reconfiguration program 110 identifies a corrective action to address the negative implication of the secondary content based on a type of secondary content and available resources. Available resources represent one or more displays not being shared with the participant users, wherein the one or more displays are on the primary client device associated with the user and/or the secondary client device associated with the user. In one example, content reconfiguration program 110 identifies a first corrective action to address secondary content that includes a web browser type and a second corrective action to address secondary content that includes a specific program type. In another example, content reconfiguration program 110 identifies a first corrective action involving a second display on the primary client device to address secondary content that includes a web browser type and a second corrective action involving a third display on a secondary client device to address the secondary content that includes a specific program type.

Content reconfiguration program 110 performs the corrective action for the negative implication of the secondary content (214). In one example, content reconfiguration program 110 performs a first corrective action on an active web browser and a second corrective action on an active program with secondary content that includes detected negative implications. For the first corrective action, content reconfiguration program 110 minimizes the active web browser and displays an omitting box overlay on a title of a webpage on the active web browser, where overlaying omitting box prevents the participant users from viewing the title of the active web browser. For the second corrective action, content reconfiguration program 110 performs an autosave on the contents of the active program and stores the contents in a newly created folder, where a presenter user has the ability to access the newly created folder with the stored content subsequent to the conclusion of the collaborative screen-sharing session. In another example, content reconfiguration program 110 performs a first corrective action on a first portion of an active program and a second corrective action on a second portion of the active program with secondary content that includes detected negative implications. The first corrective action includes restructuring the secondary content being displayed in the active program by cropping a user interface for the active program and the second corrective action includes replacing portions of the secondary content with additional content that is more relevant to the primary content being shared by the presenter user with the participant users during the collaborative session.

In yet another embodiment, content reconfiguration program 110 performs a first corrective action on an active web browser and an active program with secondary content that includes detected negative implications. The first corrective action includes content reconfiguration program 110 determining a secondary client device is active and within a vicinity (e.g., five-foot radius) of a primary client device being utilized by the presenter user for a collaborative screen-sharing session. Subsequently, content reconfiguration program 110 determines to relocate the active web browser and the active program with the secondary content that includes detected negative implications to the secondary client device, where the presenter user has the ability to view the active web browser and the active program on the secondary device.

Content reconfiguration program 110 determines whether the collaborative screen-sharing session ended (decision 218). In one embodiment, content reconfiguration program 110 receives a notification from user collaboration program 112 indicating the collaborative screen-sharing session between the presenter user and the multiple participant users has ended. In another embodiment, content reconfiguration program 110 determines the collaborative screen-sharing session between the presenter user and the multiple participant users has ended when the presenter user has stopped sharing the display with the user interface for the client device associated with the present user. In yet another embodiment, content reconfiguration program 110 determines the collaborative screen-sharing session between the presenter user and the multiple participant users has ended based on a period of time passing, where the period of time is associated with a calendar entry for the collaborative screen-sharing session.

In the event, content reconfiguration program 110 determines the collaborative screen-sharing session ended ("yes" branch, decision 218), content reconfiguration program 110 reverts the corrective action (218). In the event, content reconfiguration program 110 determines the collaborative screen sharing session has not ended ("no" branch, decision 216), content reconfiguration program 110 reverts to continuing to perform the corrective action for the negative implication of the secondary content.

Content reconfiguration program 110 reverts the corrective action (218). Content reconfiguration program 110 can revert the corrective action without input from the presenter user (i.e., without confirmation) or subsequent to input from the presenter user (i.e., with confirmation). In one example, content reconfiguration program 110 performed a first corrective action that minimized an active web browser and displayed an omitting box overlay on a title of a webpage on the active web browser, where the overlaying omitting box prevented participant users from viewing the title of the active web browser. For a second corrective action, content reconfiguration program 110 performed an autosave on the contents of the active program and stored the contents in a newly created folder, where a presenter user had the ability to access the newly created folder with the stored content subsequent to the conclusion of the collaborative screen-sharing session. Content reconfiguration program 110 reverts the first corrective action by removing the omitting box overlay on the title of the webpage and maximizing the active web browser to an original state. Content reconfiguration program 110 reverts the second corrective action by restoring the stored contents in the newly created folder to the active program. Subsequently, content reconfiguration program 110 can query the presenter user regarding deleting the stored contents in the newly created folder.

In another example, content reconfiguration program 110 performed a first corrective action that included restructuring secondary content being displayed in an active program by cropping a user interface for the active program and a second corrective action that included replacing portions of the secondary content with additional content that is more relevant to the primary content being shared by the presenter user with the participant users during the collaborative session. Content reconfiguration program 110 reverts the first corrective action by reversing the cropping of the user interface for the active program. Prior to reverting the second corrective action, content reconfiguration program 110 queries the presenter user to determine whether to store the additional content relevant to the primary content that replaced portions of the secondary content. Responsive to content reconfiguration program 110 receiving a confirmation from the presenter user, content reconfiguration program 110 stores the additional content relevant to the primary content and reverts the second corrective action by restoring the portion of the secondary content.

In yet another embodiment, content reconfiguration program 110 performed a first corrective action that included determining a secondary client device is active and within a vicinity (e.g., five-foot radius) of a primary client device being utilized by a presenter user for a collaborative screen-sharing session. Subsequently, content reconfiguration program 110 determined to relocate an active web browser and an active program with the secondary content that includes detected negative implications to the secondary client device, where the presenter user had the ability to view the active web browser and the active program on the secondary device. Prior to reverting the first corrective action, content reconfiguration program 110 queries the presenter user on whether to revert the first corrective action by moving the active web browser and the active program with the secondary content that includes detected negative implications back to the primary client device. Responsive to content reconfiguration program 110 receiving a confirmation from the presenter user to revert the first corrective action, reconfiguration program 110 receiving reverts the first corrective action by moving the active web browser and the active program with the secondary content that includes detected negative implications back to the primary client device. Responsive to content reconfiguration program 110 not receiving a confirmation (i.e., declined) from the presenter user to revert the first corrective action, content reconfiguration program 110 continues to display the active web browser and the active program with the secondary content that includes detected negative implications back to the secondary client device.

Figure 3:
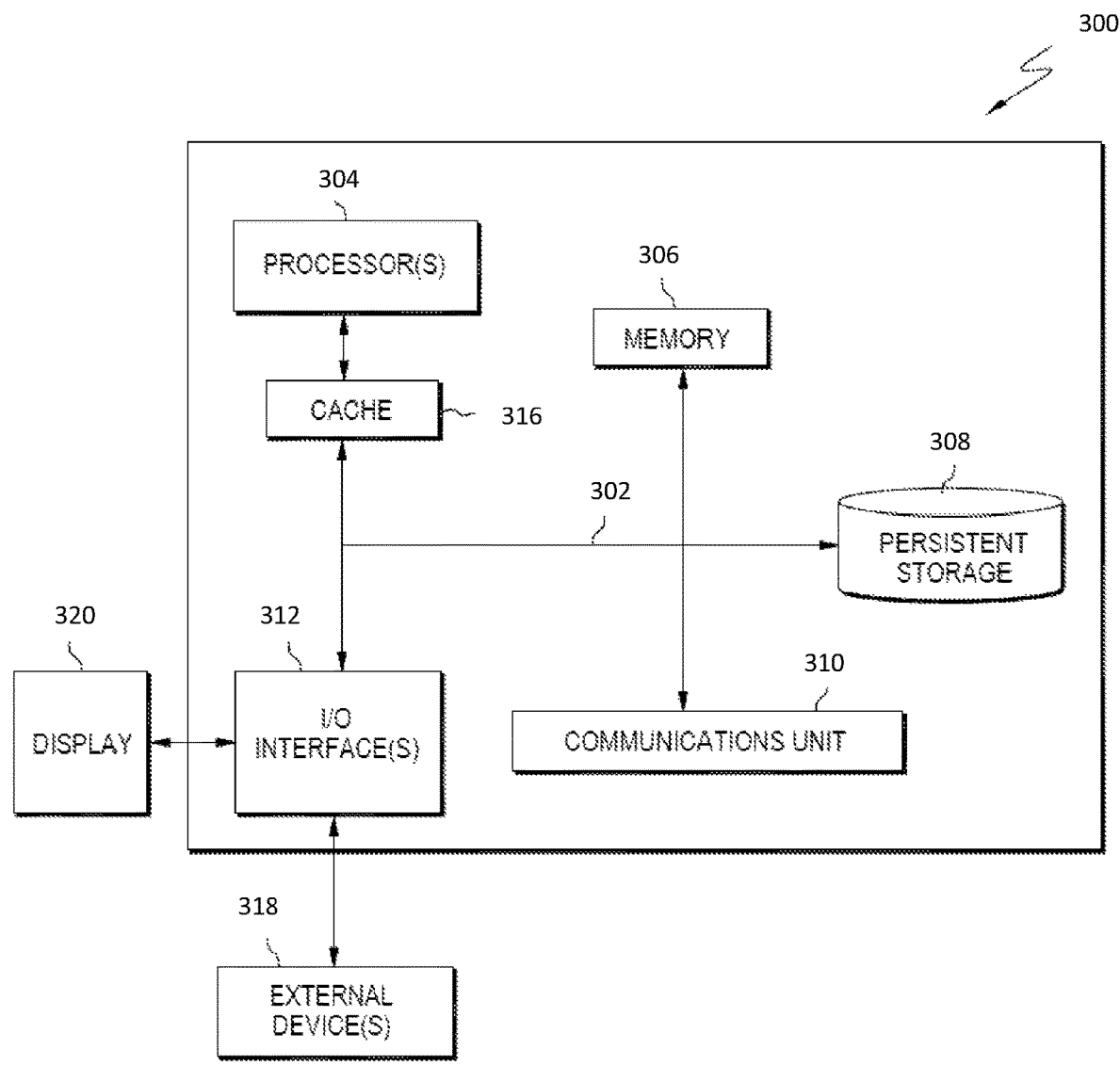
FIG. 3 depicts a block diagram of components of the server computer executing the sensor event coverage program within the distributed data processing environment of FIG. 1, in accordance with an embodiment of the present invention.

FIG. 3 depicts a computer system, where server computer 102 is an example of a computer system that can include content reconfiguration program 110. The computer system includes processors 304, cache 316, memory 306, persistent storage 308, communications unit 310, input/output (I/O) interface(s) 312 and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
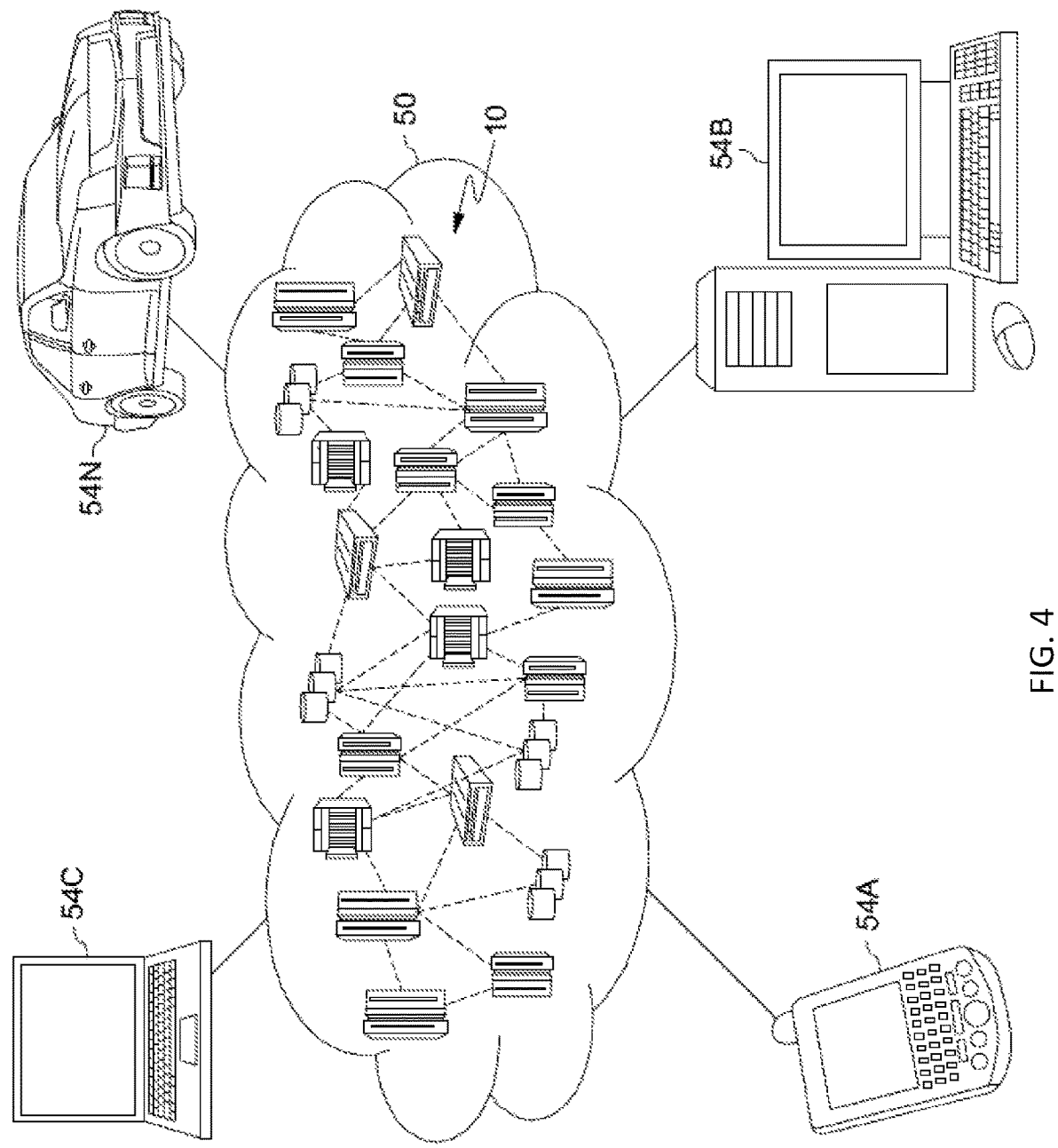
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
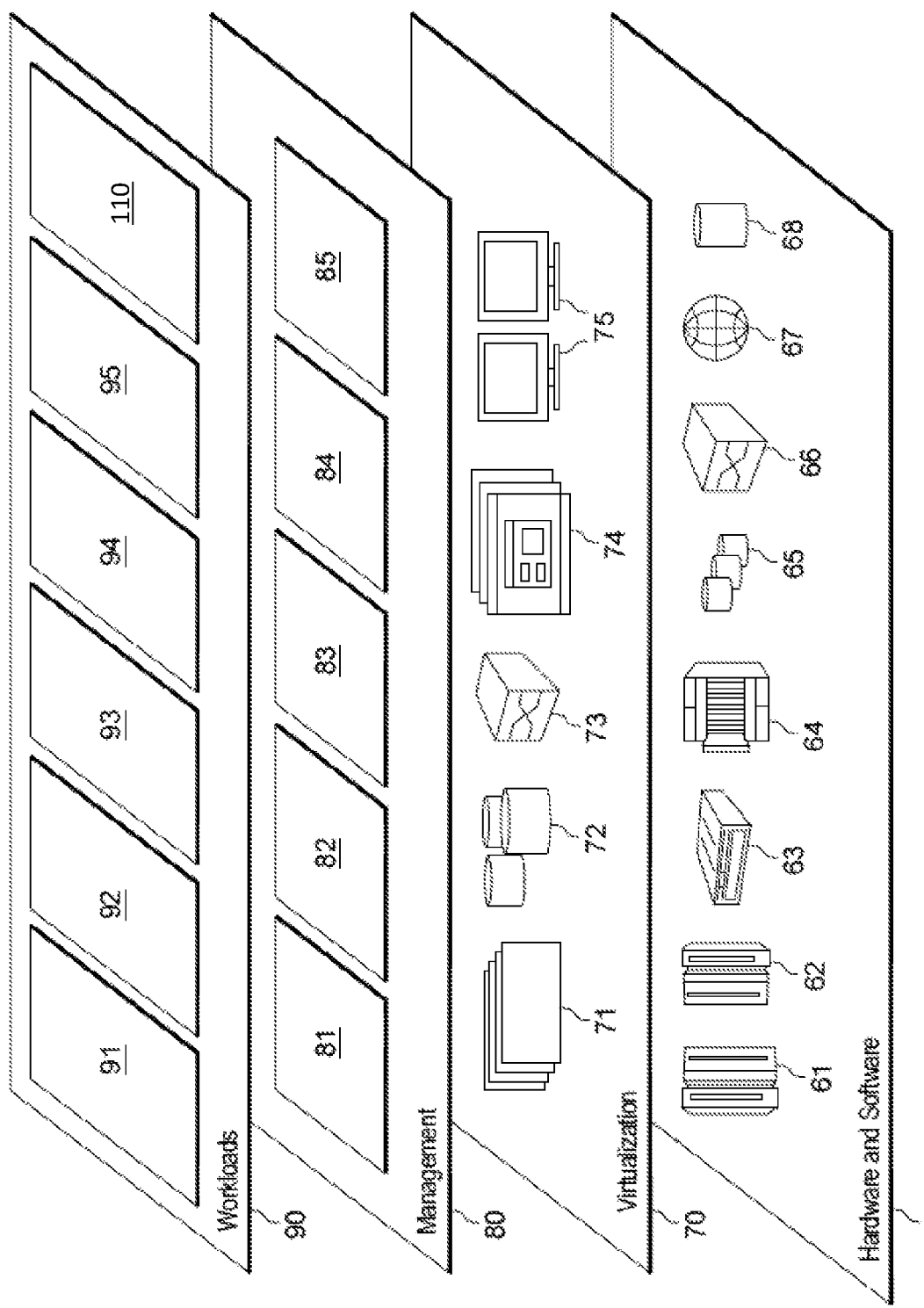
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content reconfiguration program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    initiating, by one or more processors, a collaborative session between a presenter user and one or more participant users, wherein a first display of a primary device associated with the presenter user is viewable by the one or more participant users;
    analyzing, by the one or more processors, user context for the presenter user with regards to the one or more participant users and various content in the first display of the primary device, wherein the various content is categorized by primary content and secondary content;
    analyzing, by the one or more processors, content context for the presenter user with regards to the one or more participant users and the various content in the first display of the primary device;
    determining, by the one or more processors, a negative implication is detected for the secondary content in the display of the primary device, wherein the negative implication is selected from a first group consisting of: a release of sensitive information, a release of confidential information, a release of irrelevant information with regards to the primary content, and a release of irrelevant of information with regards to a topic of discussion;
    responsive to determining the negative implication is detected for the secondary content in the display of the primary device, identifying, by the one or more processors, a first corrective action to address the negative implication for the secondary content; and
    performing, by the one or more processors, the first corrective action, wherein the first corrective action prevents the one or more participant users from viewing the secondary content and includes:
    responsive to determining a secondary device associated with the presenter user is within a vicinity of the primary device, relocating, by the one or more processors, the secondary content to the secondary device, wherein the secondary content is viewable in a second display on the secondary device by the presenter user.

2. The method of claim 1, further comprising:
    suspending, by the one or more processors, as a second corrective action, the secondary content for a configurable amount of time, wherein the configurable amount of time is selected from a second group consisting of: an expected duration of the collaborative session according to a calendar entry, an expected duration of the collaborative session according to the calendar entry duration plus a buffer period, and until the collaborative session ends.

3. The method of claim 1, further comprising:
    encapsulating, by the one or more processors, as a second corrective action, one or more portions of the secondary content that include the negative implication;
    clustering, by the one or more processors, the one or more portions of the secondary content that include the negative implication; and
    responsive to creating a file folder, storing, by the one or more processors, the one or more portions of the secondary content in the file folder.

4. The method of claim 1, further comprising:
    restructuring, by the one or more processors, as a second corrective action, the primary content by extending a first user interface for the primary content to overlap the secondary content; and
    restructuring, by the one or more processors, the secondary content by cropping a second user interface for the secondary content, wherein cropping the second user interface for the secondary content hides one or more portions of the secondary content that includes the negative implication.

5. The method of claim 1, further comprising:
    overlaying, by the one or more processors, as a second corrective action, one or more omitting boxes over one or more portions of the secondary content that includes the negative implication; and
    overlaying, by the one or more processors, information on the one or more omitting boxes relevant to the collaborative session, wherein the information relevant to the collaborative sessions is selected from a second group consisting of: an expected duration for the collaborative session, a list of participants, an agenda for the collaborative session, a plurality of summary points for the primary content, and a webpage associated with a hyperlink present in the primary content.

6. A computer program product comprising:
    one or more computer readable storage media and program instructions stored on at least one of the one or more storage media, the program instructions comprising:
    program instructions to initiate a collaborative session between a presenter user and one or more participant users, wherein a first display of a primary device associated with the presenter user is viewable by the one or more participant users;
    program instructions to analyze user context for the presenter user with regards to the one or more participant users and various content in the first display of the primary device, wherein the various content is categorized by primary content and secondary content;

program instructions to analyze content context for the presenter user with regards to the one or more participant users and the various content in the first display of the primary device;
program instructions to determine a negative implication is detected for the secondary content in the display of the primary device, wherein the negative implication is selected from a first group consisting of: a release of sensitive information, a release of confidential information, a release of irrelevant information with regards to the primary content, and a release of irrelevant of information with regards to a topic of discussion;
program instructions to, responsive to determining the negative implication is detected for the secondary content in the display of the primary device, identify a first corrective action to address the negative implication for the secondary content; and
program instructions to perform the first corrective action, wherein the first corrective action prevents the one or more participant users from viewing the secondary content and includes:
program instructions to, responsive to determining a secondary device associated with the presenter user is within a vicinity of the primary device, relocate the secondary content to the secondary device, wherein the secondary content is viewable in a second display on the secondary device by the presenter user.

7. The computer program product of claim 6, further comprising program instructions, stored on the one or more computer readable storage media, which when executed by a processor, cause the processor to:
suspend, as a second corrective action, the secondary content for a configurable amount of time, wherein the configurable amount of time is selected from a second group consisting of: an expected duration of the collaborative session according to a calendar entry, an expected duration of the collaborative session according to the calendar entry duration plus a buffer period, and until the collaborative session ends.

8. The computer program product of claim 6, further comprising program instructions, stored on the one or more computer readable storage media, which when executed by a processor, cause the processor to:
encapsulate, as a second corrective action, one or more portions of the secondary content that include the negative implication;
cluster the one or more portions of the secondary content that include the negative implication; and
responsive to creating a file folder, store the one or more portions of the secondary content in the file folder.

9. The computer program product of claim 6, further comprising program instructions, stored on the one or more computer readable storage media, which when executed by a processor, cause the processor to:
restructure, as a second corrective action, the primary content by extending a first user interface for the primary content to overlap the secondary content; and
restructure the secondary content by cropping a second user interface for the secondary content, wherein cropping the second user interface for the secondary content hides one or more portions of the secondary content that includes the negative implication.

10. The computer program product of claim 6, further comprising program instructions, stored on the one or more computer readable storage media, which when executed by a processor, cause the processor to:
overlay, as a second corrective action, one or more omitting boxes over one or more portions of the secondary content that includes the negative implication; and
overlay information on the one or more omitting boxes relevant to the collaborative session, wherein the information relevant to the collaborative sessions is selected from a second group consisting of: an expected duration for the collaborative session, a list of participants, an agenda for the collaborative session, a plurality of summary points for the primary content, and a webpage associated with a hyperlink present in the primary content.

11. A computer system comprising:
one or more computer processors;
one or more computer readable storage media; and
program instructions stored on the computer readable storage media for execution by at least one of the one or more computer processors, the program instructions comprising:
program instructions to initiate a collaborative session between a presenter user and one or more participant users, wherein a first display of a primary device associated with the presenter user is viewable by the one or more participant users;
program instructions to analyze user context for the presenter user with regards to the one or more participant users and various content in the first display of the primary device, wherein the various content is categorized by primary content and secondary content;
program instructions to analyze content context for the presenter user with regards to the one or more participant users and the various content in the first display of the primary device;
program instructions to determine a negative implication is detected for the secondary content in the display of the primary device, wherein the negative implication is selected from a first group consisting of: a release of sensitive information, a release of confidential information, a release of irrelevant information with regards to the primary content, and a release of irrelevant of information with regards to a topic of discussion;
program instructions to, responsive to determining a secondary device associated with the presenter user is within a vicinity of the primary device, identify a first corrective action to address the negative implication for the secondary content; and
program instructions to, responsive to determining the negative implication is detected for the secondary content in the display of the primary device, identify a first corrective action to address the negative implication for the secondary content; and
program instructions to perform the first corrective action, wherein the first corrective action prevents the one or more participant users from viewing the secondary content and includes:
program instructions to, responsive to determining a secondary device associated with the presenter user is within a vicinity of the primary device, relocate the secondary content to the secondary device, wherein the secondary content is viewable in a second display on the secondary device by the presenter user.

12. The computer system of claim 11, further comprising program instructions, stored on the one or more computer readable storage media, which when executed by a processor, cause the processor to:

suspend, as a second corrective action, the secondary content for a configurable amount of time, wherein the configurable amount of time is selected from a second group consisting of: an expected duration of the collaborative session according to a calendar entry, an expected duration of the collaborative session according to the calendar entry duration plus a buffer period, and until the collaborative session ends.

13. The computer system of claim 11, further comprising program instructions, stored on the one or more computer readable storage media, which when executed by a processor, cause the processor to:

encapsulate, as a second corrective action, one or more portions of the secondary content that include the negative implication;

cluster the one or more portions of the secondary content that include the negative implication; and responsive to creating a file folder, store the one or more portions of the secondary content in the file folder.

14. The computer system of claim 11, further comprising program instructions, stored on the one or more computer readable storage media, which when executed by a processor, cause the processor to:

restructure, as a second corrective action, the primary content by extending a first user interface for the primary content to overlap the secondary content; and restructure the secondary content by cropping a second user interface for the secondary content, wherein cropping the second user interface for the secondary content hides one or more portions of the secondary content that includes the negative implication.

15. The computer system of claim 11, further comprising program instructions, stored on the one or more computer readable storage media, which when executed by a processor, cause the processor to:

overlay, as a second corrective action, one or more omitting boxes over one or more portions of the secondary content that includes the negative implication; and overlay information on the one or more omitting boxes relevant to the collaborative session, wherein the information relevant to the collaborative sessions is selected from a second group consisting of: an expected duration for the collaborative session, a list of participants, an agenda for the collaborative session, a plurality of summary points for the primary content, and a webpage associated with a hyperlink present in the primary content.

\* \* \* \* \*